US011303810B2

(12) United States Patent
Zou et al.

(10) Patent No.: US 11,303,810 B2
(45) Date of Patent: Apr. 12, 2022

(54) IMAGE DATA PROCESSING METHOD, DEVICE, PLATFORM, AND STORAGE MEDIUM

(71) Applicant: SZ DJI TECHNOLOGY CO., LTD., Shenzhen (CN)

(72) Inventors: Wen Zou, Shenzhen (CN); Ziyi Pan, Shenzhen (CN); Xiaozheng Tang, Shenzhen (CN); Xiang Gao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/921,515

(22) Filed: Jul. 6, 2020

(65) Prior Publication Data

US 2020/0336662 A1    Oct. 22, 2020

Related U.S. Application Data

(63) Continuation of application No. PCT/CN2018/071690, filed on Jan. 7, 2018.

(51) Int. Cl.
*H04N 5/232* (2006.01)
*G06T 7/11* (2017.01)
*H04N 7/18* (2006.01)

(52) U.S. Cl.
CPC ............ *H04N 5/23245* (2013.01); *G06T 7/11* (2017.01); *H04N 5/23267* (2013.01); *H04N 7/18* (2013.01); *G06T 2207/20132* (2013.01)

(58) Field of Classification Search
CPC .. H04N 5/23245; H04N 5/23267; H04N 7/18; H04N 7/185; H04N 5/21; G06T 7/11; G06T 2207/20132
See application file for complete search history.

(56) References Cited

U.S. PATENT DOCUMENTS

| 10,735,653 | B1* | 8/2020 | Huang ............... G06K 9/00255 |
| 2008/0218613 | A1* | 9/2008 | Janson ............... H04N 5/23267 348/262 |
| 2015/0226551 | A1* | 8/2015 | Lane ...................... G01C 5/005 348/117 |
| 2017/0121034 | A1* | 5/2017 | Fisher ................ H04N 5/23267 |

(Continued)

FOREIGN PATENT DOCUMENTS

| CN | 102665032 A | 9/2012 |
| CN | 104869285 A | 8/2015 |

(Continued)

OTHER PUBLICATIONS

The World Intellectual Property Organization (WIPO) International Search Report for PCT/CN2018/071690 Sep. 25, 2018 6 pages.

*Primary Examiner* — Tracy Y. Li
(74) *Attorney, Agent, or Firm* — Anova Law Group, PLLC

(57) ABSTRACT

An image data processing method includes obtaining flight state information of an unmanned aerial vehicle (UAV), selecting a target image processing strategy from a plurality of image processing strategies based on the flight state information, and processing image data obtained by an imaging device carried by the UAV based on the target image processing strategy to obtain processed image data. The plurality of image processing strategies include an image stabilization strategy.

20 Claims, 8 Drawing Sheets

(56) References Cited

U.S. PATENT DOCUMENTS

2018/0120107 A1\* 5/2018 Maehara .................. G06T 7/593
2019/0174063 A1\* 6/2019 Huang ................... B64D 47/08
2019/0208101 A1\* 7/2019 Gohl .................. H04N 5/23258

FOREIGN PATENT DOCUMENTS

| CN | 105007398 A | 10/2015 |
|----|-------------|---------|
| CN | 105031935 A | 11/2015 |
| CN | 205263655 U | 5/2016 |
| CN | 106060469 A | 10/2016 |
| CN | 106162145 A | 11/2016 |
| CN | 107113406 A | 8/2017 |
| CN | 110268710 A | 9/2019 |
| KR | 101083128 B1 | 11/2011 |
| WO | 2019134155 A1 | 7/2019 |

\* cited by examiner

IMAGE DATA PROCESSING METHOD, DEVICE, PLATFORM, AND STORAGE MEDIUM

CROSS-REFERENCE TO RELATED APPLICATION

This application is a continuation of International Application No. PCT/CN2018/071690, filed on Jan. 7, 2018, the entire content of which is incorporated herein by reference.

TECHNICAL FIELD

The present disclosure relates to the field of control technology and, more specifically, to an image data processing method, device, platform, and storage medium.

BACKGROUND

With the development of flight technology, aircrafts such as unmanned aerial vehicles (UAVs) and unmanned robots are widely used in plant protection, aerial photography, forest fire alarm monitoring, etc., which brings many conveniences to people's daily activities. In the process of shooting with an aircraft, since the aircraft can be affected by factors such as airflow or vehicle body vibration, the image obtained can be distorted, which may result in poor quality of the obtained image, as such, it is difficult to obtain useful information from the image. Therefore, extensive researches have been devoted to improve quality of the obtained image.

SUMMARY

In accordance with the disclosure, there is provided an image data processing method including obtaining flight state information of an unmanned aerial vehicle (UAV), selecting a target image processing strategy from a plurality of image processing strategies based on the flight state information, and processing image data obtained by an imaging device carried by the UAV based on the target image processing strategy to obtain processed image data. The plurality of image processing strategies include an image stabilization strategy.

Also in accordance with the disclosure, there is provided a smart device including a processor and a memory storing program instructions that, when executed by the processor, cause the processor to obtain flight state information of an unmanned aerial vehicle (UAV), select a target image processing strategy from a plurality of image processing strategies based on the flight state information, and process image data obtained by an imaging device carried by the UAV based on the target image processing strategy to obtain processed image data. The plurality of image processing strategies include an image stabilization strategy.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The present disclosure provides an image data processing method, device, and apparatus, which can select an image stabilization strategy based on the flight state of the aircraft, thereby improving the quality of the obtained image data.

For better understanding of the image data processing method, device, platform, and storage medium provided by the embodiments of the present disclosure, an image data processing system of the embodiment of the present disclosure will be described below.

Figure 1A:
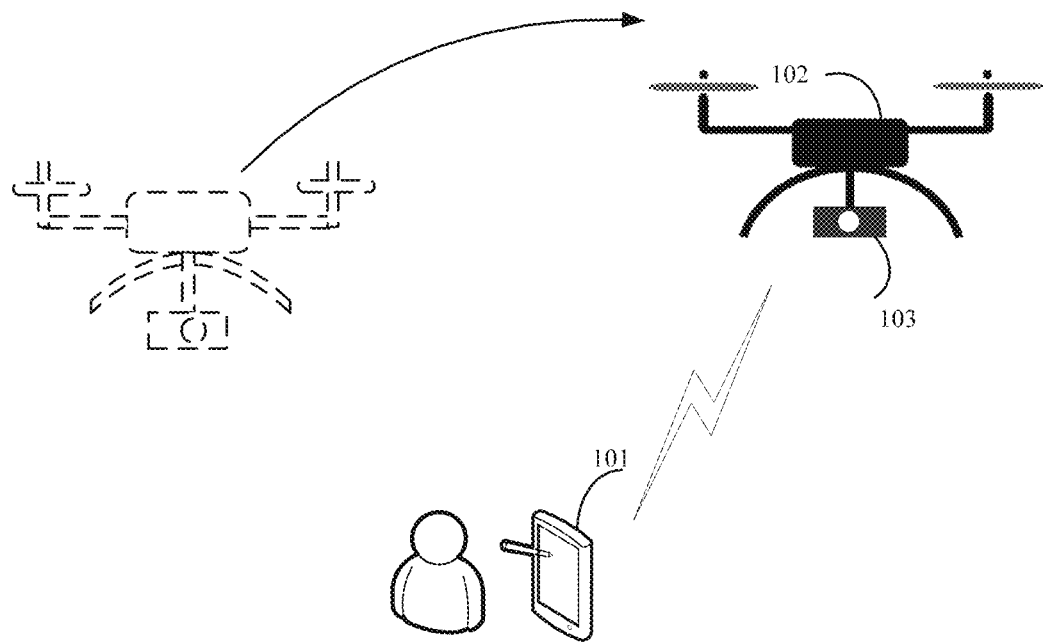
FIG. 1A is a structural diagram of an image data processing system according to an embodiment of the present disclosure.

FIG. 1A is a structural diagram of an image data processing system according to an embodiment of the present disclosure. The image data processing system includes a smart device 101, an unmanned aerial vehicle (UAV) 102, and an imaging device 103 carried by the UAV.

The UAV 102 may include a UAV body. The UAV body can be equipped with a gimbal or another mounting device. The imaging device 103 (such as a main camera, a monocular camera, a binocular camera, etc.) can be carried by the gimbal or another mounting device for obtaining video data or image data during the flight of the UAV 102. The UAV 102 may also include a positioning sensor (such as a global positioning system (GPS) sensor), a barometer, an electronic compass, a compass, etc., which is not limited in the embodiments of the present disclosure.

The UAV 102 and the smart device 101 may communicate via a network (e.g., a wireless connection). The wireless connection may be, for example, a cellular mobile data network, a wireless fidelity (Wi-Fi), an infrared, a Bluetooth, etc. which is not limited in the embodiments of the present disclosure.

The smart device 101 can be stationary or mobile. The smart device 101 may have a remote control function, and may send an instruction to the imaging device 103 or the UAV. For example, the smart device 101 may send an instruction to the UAV to instruct the UAV to return flight attitude data.

In some embodiments, the smart device 101 may be the imaging device 103, or the smart device 101 may be another terminal, which is not limited in the present disclosure.

It should be noted that FIG. 1 includes a UAV drawn by dotted lines and a UAV drawn by solid lines to indicate that the UAV is in flight. That is, the image data is obtained during the flight of the UAV.

The image data processing system can be used to implement the image data processing method provided by the embodiments of the present disclosure. More specifically, the smart device 101 may select different image processing strategies based on the flight state of the UAV 102. If the flight state of the aircraft is in a low speed mode, the smart device 101 may select an image stabilization strategy, such as an electronic image stabilization (EIS) strategy. If the flight state of the aircraft is in a high speed mode and the active imaging mode of the imaging mode device 103 is a video imaging mode, the smart device 101 may select an image cropping strategy, and process the image data obtained by the imaging device based on the selected image processing strategy to obtain the processed image data.

Figure 1B:
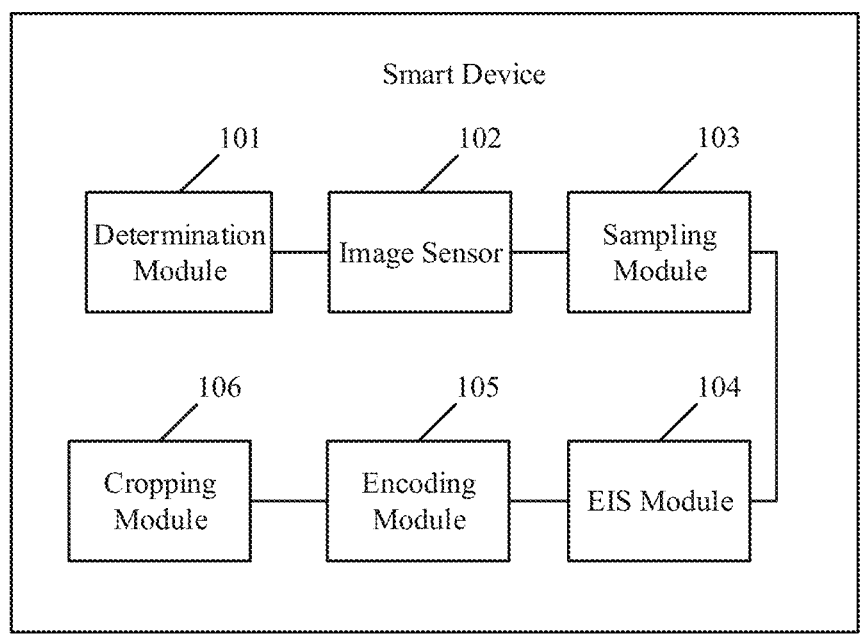
FIG. 1B is a structural diagram of a smart device according to an embodiment of the present disclosure.

FIG. 1B is a structural diagram of a smart device according to an embodiment of the present disclosure. The smart device may be an imaging device carried by the UAV. The smart device includes a determination module 101, an image sensor 102, a sampling module 103, an EIS module 104, an encoding module 105, and a cropping module 106. The smart device can be used to implement the image data processing method provided by the embodiments of the present disclosure.

In some embodiments, the smart device can also perform sampling processing, cropping processing, or encoding processing on the obtained image data. The method provided by the embodiments of the present disclosure can be used not only to stabilize image data, but also video data. In particular, for the implementation of the stabilization processing of the video data, reference may be made to the implementation of the stabilization processing of the image data provided in the embodiments of the present disclosure, and details will not be repeated here.

Figure 1C:
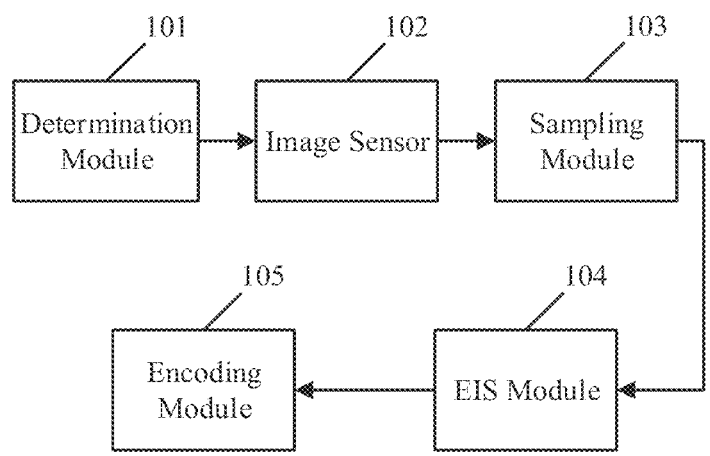
FIG. 1C is a diagram showing a process for obtaining image data or obtaining video data according to an embodiment of the present disclosure.

In some embodiments, if it is determined that the flight state of the UAV is in the low speed mode state and the imaging device has started an imaging preview mode, the smart device may use a first processing manner to obtain image data. FIG. 1C is a diagram showing the process of the smart device obtaining the image data by using the first processing manner. In particular, if the determination module 101 determines that the flight state of the UAV is in the low speed mode state and the imaging device has started an image acquisition mode, the image sensor 102 may use a first field of view parameter to obtain image data. The image data may be sent to the sampling module 103, and the sampling module 103 may perform sampling processing on the image data by using a first sampling rule, and send the sampled image data to the EIS module 104. The EIS module 104 may process the sampled image data based on the electronic image stabilization strategy, and send the processed image data to the encoding module 105. The encoding module 105 may encode the processed image data to obtain the needed image data. As such, the situation of distorted image data due to hovering or slow flight of the UAV may be avoided, thereby improving the quality of the image data.

In some embodiments, if it is determined that the flight state of the UAV is in the low speed mode state and the imaging device has started a video capturing mode, the smart device may use a second processing manner to obtain video data. FIG. 1C also shows the process of the smart device obtaining the video data by using the second processing manner is shown in FIG. 1C. In particular, if the determination module 101 determines that the flight state of the UAV is in the low speed mode state and the imaging has started a video acquisition mode, the image sensor 102 may use the second field of view parameter to obtain video data. The video data may be sent to the sampling module 103, and the sampling module 103 may perform sampling processing on the video data by using a second sampling rule, and send the sampled video data to the EIS module 104. The EIS module 104 may process the sampled video data based on the electronic image stabilization strategy, and send the processed video data to the encoding module 105. The encoding module 105 may encode the processed video data to obtain the needed video data. As such, the situation of jittered video in the video data image data due to hovering or slow flight of the UAV may be avoided, thereby improving the quality of the video data.

Figure 1D:
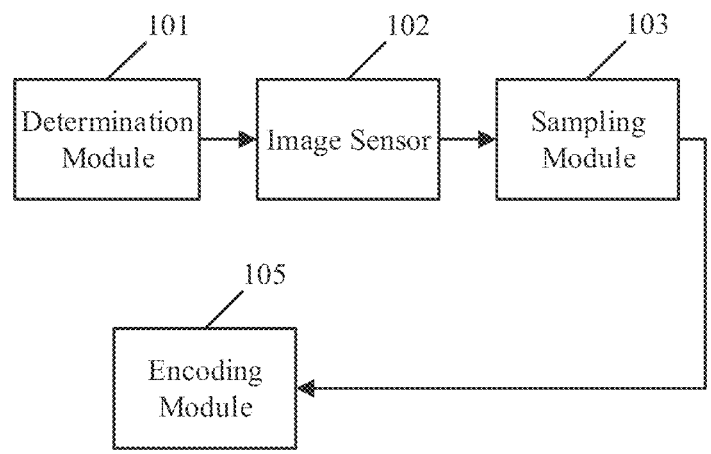
FIG. 1D is a diagram showing a process for obtaining image data according to another embodiment of the present disclosure.

In some embodiments, if it is determined that the flight state of the UAV is in the high speed mode state and the imaging device has started the imaging preview mode, the smart device may use a third processing manner to obtain image data. The diagram of the process of the smart device obtaining the image data by using the third processing manner is shown in FIG. 1D. In particular, if the determination module 101 determines that the flight state of the UAV is in the high speed mode state and the imaging has started the image acquisition mode, the image sensor 102 may use a third field of view parameter to obtain image data. The image data may be sent to the sampling module 103, and the sampling module 103 may perform sampling processing on the image data by using a third sampling rule, and send the sampled image data to the encoding module 105. The encoding module 105 may encode the sampled image data to obtain the needed image data. As such, the most real image data can be send to the user during the fast flight of the UAV, which can avoid the large-scale correction of the image data that results in low pixel utilization of the image data, thereby improving the quality of the image data.

Figure 1E:
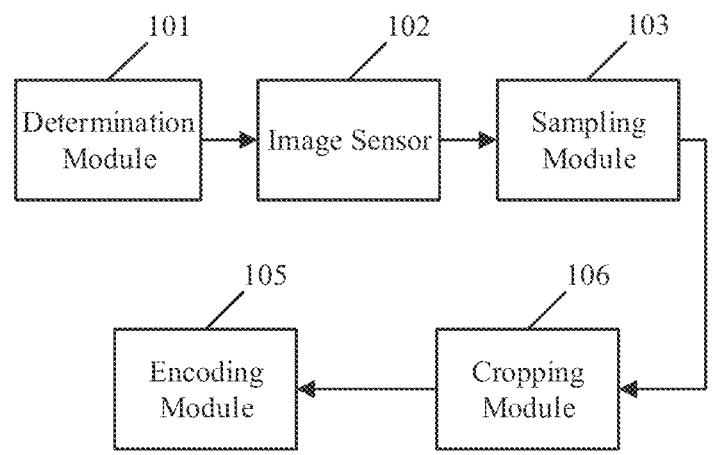
FIG. 1E is a diagram showing a process for obtaining video data according to another embodiment of the present disclosure.

In some embodiments, if it is determined that the flight state of the UAV is in the high speed mode state and the imaging device has started the video capturing mode, the smart device may use a fourth processing manner to obtain image data. The diagram of the process of the smart device obtaining the video data by using the fourth processing manner is shown in FIG. 1E. In particular, if the determination module 101 determines that the flight state of the UAV is in the high speed mode state and the imaging started the video acquisition mode, the image sensor 102 may use a fourth field of view parameter to obtain video data. The video data may be sent to the sampling module 103, and the sampling module 103 may perform sampling processing on the image data by using a fourth sampling rule, and send the sampled image data to the cropping module 106. The cropping module 106 may perform cropping processing on the sampled video data, and send the cropped video data to the encoding module 105. The encoding module 105 may encode the cropped video data to obtain the needed video data. As such, the most real image data can be send to the user during the fast flight of the UAV, which can avoid the large-scale correction of the image data that results in low pixel utilization of the image data, thereby improving the quality of the image data.

In some embodiments, the flight state being in the high speed mode described above may be that the flight speed of the UAV is greater than or equal to a predetermined speed threshold. In addition, the flight state being in the low speed mode described above may be that the flight speed of the UAV is less than a predetermined speed threshold.

The field of view of the imaging device can be set based on the flight stability of the UAV. For example, if the stability of the UAV is high, a smaller field of view can be set; if the stability of the UAV is low, a larger field of view can be set. Further, the field of view of the imaging device can be set based on the size of the imaging area (or subject). For example, if the imaging area is relatively large, a larger field of view can be set; if the imaging area is relatively small, a smaller field of view can be set. In addition, the field of view of the imaging device can be set based on the imaging mode, or it can be set manually by the user, which is not limited in the embodiments of the present disclosure.

In some embodiments, the smart device can set the first field of view to DFOV=67.6°, HFOV=56.4°, VFOV=43.8°; the smart device can set the second field of view to DFOV=57.3°, HFOV=50.9°, VFOV=30.0°; the smart device can set the third field of view to DFOV=67.6°, HFOV=56.4°, VFOV=43.8°; and the smart device can set the fourth field of view to DFOV=78.7°, HFOV=71.1°, VFOV=43.8°, where DFOV is a diagonal field of view, HFOV is a horizontal field of view, and VFOV is a vertical field of view.

In some embodiments, the specific method for the EIS module 104 to process the sampled image data based on the electronic image stabilization strategy may include determining flight attitude information of the UAV based on an angular velocity obtained by the UAV's inertial measurement unit (IMU), determining attitude measurement data of the imaging device based on the flight attitude information of the UAV, calculating an amount of attitude correction based on the attitude measurement data of the imaging device and a target attitude data of the imaging device, and processing the sampled image data based on the attitude correction amount to obtain the processed image data.

In some embodiments, the attitude correction amount may include a first correction amount, a second correction amount, and a third correction amount. The first correction amount may be a correction amount corresponding to a pitch attitude angle, the second correction amount may be a correction amount corresponding to a roll attitude angle, and the third correction amount may be a correction amount corresponding to a yaw attitude angle.

In some embodiments, since the flight speed of the UAV may change relatively quick, to improve the quality of the image, the size of the first correction amount, the second correction amount, and the correction amount can be limited. At the same time, since the three correction amounts are related and changes in the pitch attitude angle and the roll attitude angle have a greater impact on the image, the first correction amount and the second correction amount may be determined first. When there is a remaining amount of attitude correction, the third correction amount may be determined. That is, the first correction amount and the second correction amount may be determined based on the attitude measurement data and the target attitude data. Subsequently, whether there is a remaining amount of attitude correction may be detected based on the first correction amount, the second correction amount, and the total correction amount set for the image data. If there is a remaining amount of attitude correction, the third correction amount may be determined based on the remaining amount of attitude correction. Therefore, the quality of the image stabilization process can be improved.

Figure 1F:
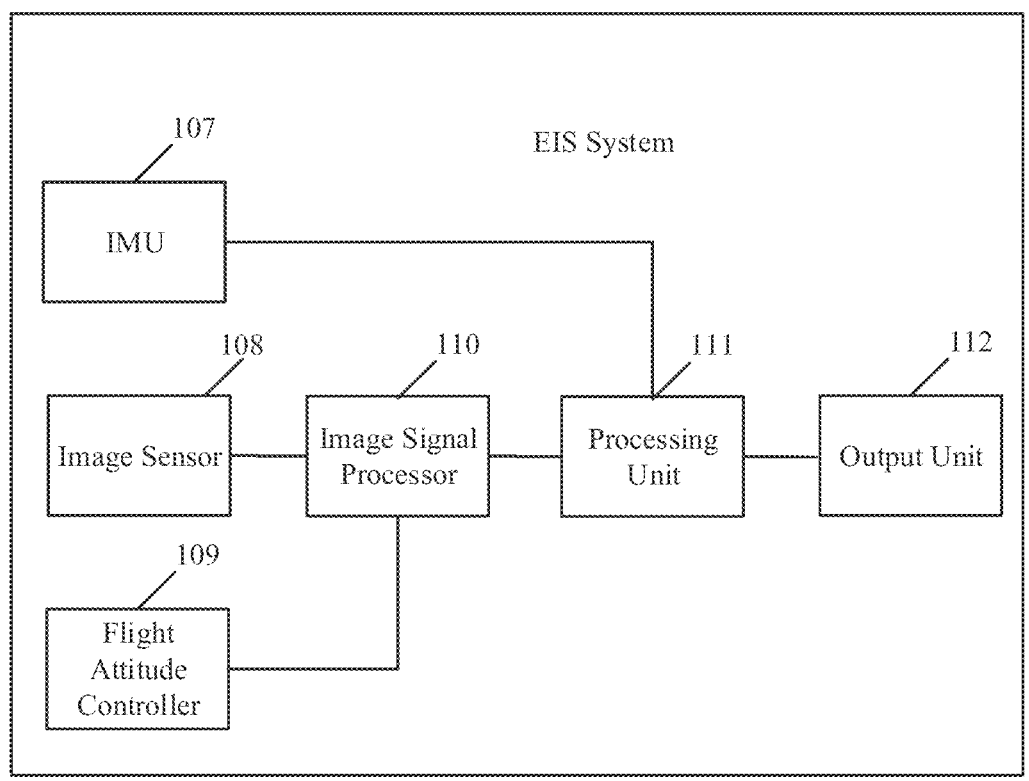
FIG. 1F is a structural diagram of an electronic image stabilization (EIS) system according to an embodiment of the present disclosure.

FIG. 1F is a structural diagram of an EIS system according to an embodiment of the present disclosure. The EIS system includes an inertial measurement unit (IMU) 107, an image sensor 108, a flight attitude controller 109, an image signal processor (ISP) 110, a processing unit 111, and an output unit 112. The EIS system can be applied to the processing of the obtained image data by using electronic image stabilization.

More specifically, the imaging device may be a device that performs exposure imaging in units of pixel rows. The flight attitude controller 109 may be configured to obtain the current flight attitude of the UAV, and determine the flight state of the UAV based on the current flight attitude. If the flight state of the UAV is in the low speed mode, the IMU 107 may be configured to obtain the angular velocity of the UAV and send the angular velocity of the UAV to the processing unit 111. The processing unit 111 may be configured to perform integral calculation on the received angular velocity of the UAV to obtain the current flight information of the UAV, filter the flight attitude data in the current attitude information of the UAV to obtain the target attitude data of the imaging device, and determine the attitude measurement data of the imaging device based on the current attitude information of the UAV. The image sensor 108 may be configured to obtain images during the flight of the UAV, obtain the image data, record the exposure parameters of the image data, and send the image data and the exposure parameters to the image signal processor 110. The image signal processor 110 may be configured to perform sampling processing on the image data, and send the sampled image data and exposure parameters to the processing unit 111. The processing unit 111 may be further configured to align with lines of the processed image data by using the time stamp of the attitude measurement data of the imaging device, the exposure parameters, the attitude measurement data, and the target attitude data. As such, each frame of the image data may have corresponding target attitude data of the imaging device, and each line of each frame of image data may have corresponding attitude measurement data. When the UAV is in different flight states, the difference between the attitude measurement data of the imaging device and the target attitude data may be different. The EIS system may determine the amount of correction needed to correct the image data based on the difference between the attitude measurement data of the imaging device and the target attitude data, correct the image data based on the determined amount of correction to obtain the image data obtained by the imaging device after the stabilization process, and send the obtained image data to the output unit 112. The output unit 112 may be configured to store or send the image data after the stabilization process to other devices. As such, the situation of distorted image data due to hovering or slow flight of the UAV may be avoided, thereby improving the quality of the image data.

In some embodiments, the exposure parameters may include the number of exposure lines of the obtained image data and the exposure duration of each line of the image data. For example, if the number of exposure lines of the image data is 3000 lines, and the exposure duration of each line of the image data is 0.01 ms, the total exposure time of one frame of image data may be 30 ms based on the number of exposure lines and the exposure duration of each line of the image data. If the frequency of the IMU outputting the angular velocity of the UAV is 1 kHz, the acquisition frequency of the attitude measurement data of the imaging device is also 1 kHz, 30 pieces of attitude measurement data corresponding to one frame of image data may be calculated. That is, 100 consecutive lines of image data may correspond to piece of attitude measurement data.

Figure 1G:
FIG. 1G is a diagram of image data obtained by an imaging device according to an embodiment of the present disclosure.
Figure 1H:
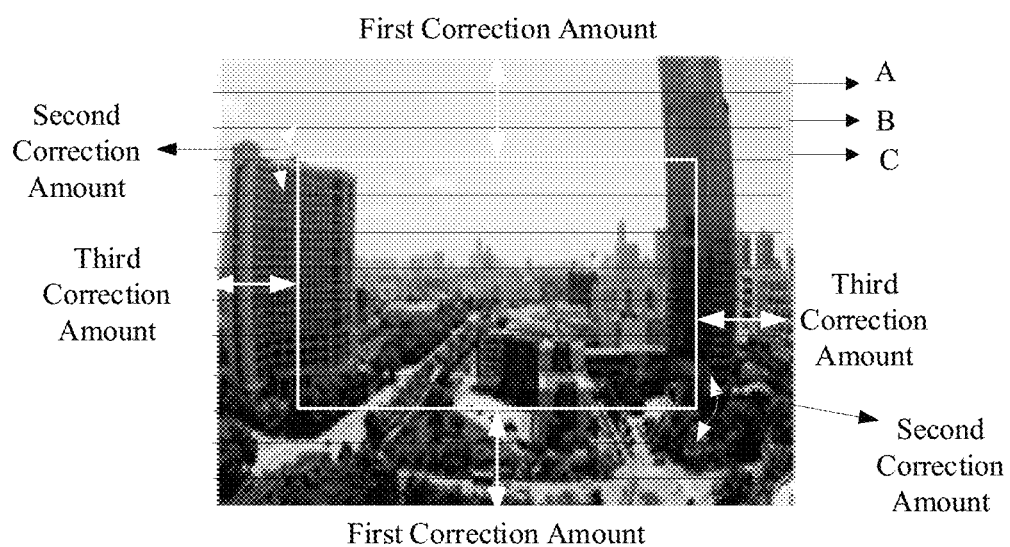
FIG. 1H is a diagram of image data in a correction process according to an embodiment of the present disclosure.
Figure 1I:
FIG. 1I is a diagram of processed image data according to an embodiment of the present disclosure.

FIG. 1G shows example image data obtained by the imaging device. If the imaging device is a device that performs exposure imaging in units of pixel rows, the attitude measurement data corresponding to each line of image data may be calculated by the exposure parameters and the attitude measurement data of the imaging device. As shown in FIG. 1H, the attitude measurement data corresponding to the first line of the image data is A, the attitude measurement data corresponding to the second line of the image data is B, the attitude measurement data corresponding to the third line of the image data is C, and the other rows may also have corresponding attitude measurement data, which will not be repeated here. The smart device may determine the first correction amount and the second correction amount based on the attitude measurement data and the target attitude data, and detect whether there is a remaining amount of attitude correction based on the first correction amount, the second correction amount, and the total correction amount set for the image data. When there is a remaining amount of attitude correction, the third correction amount may be determined based on the remaining amount of attitude correction. As shown in FIG. 1H, the target image area is obtained by moving the specified area (the area of interest to the user, as shown in the white rectangular frame in FIG. 1H) in the image data up or down using the first correction amount, is rotating the specified area in the image data using the second correction amount, and moving the specified area in the image data left or right using the third correction amount. The target image area is processed (such as encoding) to obtain the processed image data. The processed image data is shown in FIG. 1I.

Figure 2:
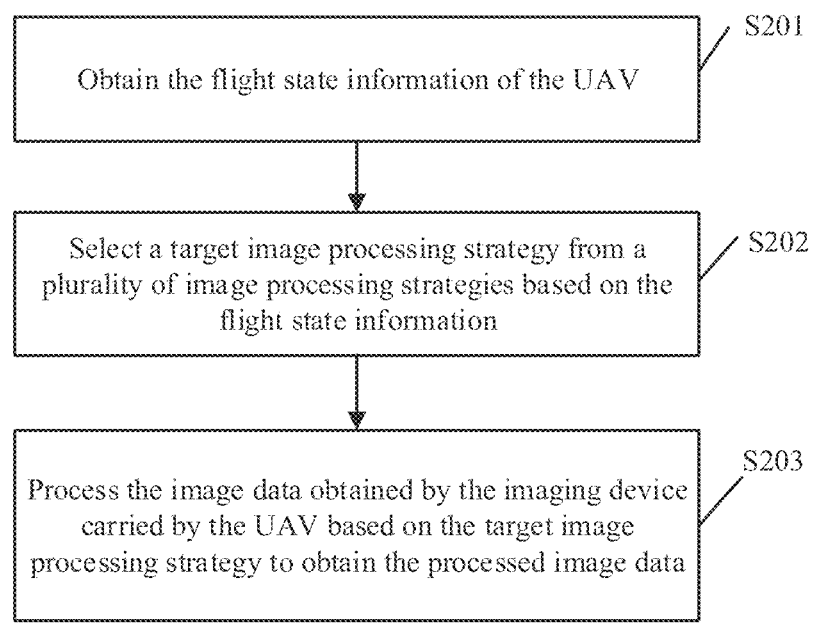
FIG. 2 is a flowchart of an image data processing method according to an embodiment of the present disclosure.

FIG. 2 shows an image data processing method according to an embodiment of the present disclosure. The image data processing method can be applied to an image data processing system. The image data processing system may include a UAV, an imaging device carried by the UAV, and a smart device. The smart device may be the imaging device, or one or more of the terminals that control the UAV, such as a remote control, a smartphone, a tablet computer, a laptop computer, and a ground station. The image data processing method will be described in detail below.

S201, obtaining the flight state information of the UAV.

In some embodiments, the smart device may obtain the flight state information of the UAV through the IMU of the UAV, and the flight state information may include flight speed or flight attitude information.

S202, selecting a target image processing strategy from a plurality of image processing strategies based on the flight state information, the plurality of image processing strategies include an image stabilization strategy.

In some embodiments, the smart device can select the target image processing strategy from a plurality of image processing strategies based on the flight state information. The plurality of image processing strategies include an image stabilization strategy. The plurality of image processing strategies may also include an image cropping strategy and the like.

The image stabilization strategy may also include an image stabilization strategy by adjusting the attitude of the gimbal, or an electronic image stabilization strategy. The smart device may dynamically select image stabilization strategy as needed, or dynamically select the image stabilization strategy based on the application scenario. For example, in an application scenario where the gimbal is not disposed at the UAV, the smart device may select the electronic image stabilization strategy to process the image data. In some embodiments, the smart device may dynamically select the image stabilization strategy based on the stabilization effect of each image stabilization strategy or the user needs.

In some embodiments, the flight state information may include attitude information. The specific implementation method of selecting the target image processing strategy from a plurality of image processing strategies based on the flight state information may include determining a flight attitude angle of the UAV based on the attitude information of the UAV; selecting the image stabilization strategy as the target image processing strategy in response to the flight attitude angle being less than a predetermined attitude angle; or, selecting the image cropping strategy as the target image processing strategy in response to the flight attitude angle being greater than or equal to the predetermined attitude angle and detecting the imaging mode initiated by the imaging device is a video capturing mode.

The smart device may determine the flight attitude angle of the UAV based on the attitude information of the UAV. If the flight attitude angle is less than the predetermined attitude angle, the flight state of the UAV may be determined to be in the low speed mode. The image stabilization strategy may be selected as the target image processing strategy, which can avoid the situation of distorted image data due to hovering or slow flight of the UAV, thereby improving the quality of the image data. If the flight attitude angle is greater than or equal to the predetermined attitude angle, the flight state of the UAV may be determined to be in the high speed mode. The image cropping strategy may be selected as the target image processing strategy. As such, the most real image data can be sent to the user during the fast flight of the UAV, which can avoid the large-scale correction of the image data that results in low pixel utilization of the image data, thereby improving the quality of the image data.

In some embodiments, the predetermined attitude angle may be 15°. If the attitude angle of the UAV is 8°, the smart may determine that the flight attitude angle is less than the predetermined attitude angle, determine that the flight state of the UAV is in the low speed mode, and select the image stabilization strategy as the target image processing strategy. If the attitude angle of the UAV is 16°, the smart may determine that the flight attitude angle is greater than or equal to the predetermined attitude angle, determine that the flight state of the UAV is in the high speed mode, detect that the imaging mode initiated by the imaging device is the video capturing mode, and select the image cropping strategy as the target image processing strategy.

The predetermined attitude angle described above may be set to 9°. In addition, if the attitude angle of the UAV is greater than 9°, the flight state of the UAV may be determined to be the in high speed mode; and, if the attitude angle of the UAV is less than 9°, the flight state of the UAV may be determined to be in the low speed mode.

In some embodiments, if the flight attitude angle is greater than or equal to the predetermined attitude angle, the smart device may sample the obtained image data to obtain the processed image data. As such, the most real image data can be sent to the user, which can avoid the large-scale correction of the image data that results in low pixel utilization of the image data, thereby improving the quality of the video data.

In some embodiments, the flight state information may include the flight speed. The specific implementation method of selecting the target image processing strategy from a plurality of image processing strategies based on the flight state information may include selecting the image stabilization strategy as the target image processing strategy in response to the flight speed of the UAV being less than a predetermined speed threshold; or, selecting the image cropping strategy as the target image processing strategy in response to the flight speed of the UAV being greater than or equal to the predetermined speed threshold.

If the flight speed of the UAV is less than the predetermined speed threshold, the smart device may determine that the flight state of the UAV is in the low speed mode. The image stabilization strategy may be selected as the target image processing strategy, which can avoid the situation of distorted image data due to hovering or slow flight of the UAV, thereby improving the quality of the image data. If the flight speed of the UAV is greater than or equal to the predetermined speed threshold, the smart device may determine that the flight state of the UAV is in the high speed mode. The image cropping strategy may be selected as the target image processing strategy. As such, the most real image data can be sent to the user during the fast flight of the UAV, which can avoid the large-scale correction of the video data that results in low pixel utilization of the image data, thereby improving the quality of the video data.

In some embodiments, obtaining the imaging mode initiated by the imaging device may include selecting the target image processing strategy from the plurality of image processing strategies based on the flight state information and the imaging mode.

The smart device may select the target image processing strategy from the plurality of image processing strategies based on the flight state information and the imaging mode. That is, if the flight state of the UAV is in the low speed mode and the imaging mode of the imaging device is in the video capturing mode or the preview mode, the image stabilization strategy may be selected as the target image processing strategy. Further, if the flight state of the UAV is in the high speed mode and the imaging mode of the imaging device is in the video capturing mode, the image cropping strategy may be selected as the target image processing strategy. Furthermore, if the flight state of the UAV is in the high speed mode and the imaging mode of the imaging device is in the imaging preview mode, the image data may not be processed to provide the most real image data to the user. As such, different image data processing strategies may be selected based on the flight state and imaging mode of the imaging device to meet various user needs for the image data.

S203, processing the image data obtained by the imaging device carried by the UAV based on the target image processing strategy to obtain the processed image data.

In some embodiments, the smart device may process the image data obtained by the imaging device carried by the UAV based on the target image processing strategy to obtain the processed image data, which can improve the quality of the image data.

In some embodiments, the before performing S203, the smart device may further include setting a field of view of the imaging device based on the selected target image processing strategy, and obtaining the image data through the imaging device with the set field of view.

Since the size of the processed image data obtained different image data strategies may be different, in order for the smart device to obtain useful information from the obtained image data processed by the image processing strategy, the smart device may set the field of view of the imaging device based on the selected target image processing strategy, such that the quality of the obtained image data can be improved.

If the selected image processing strategy is an image stabilization strategy, since the amount of correction of the image stabilization strategy is relative small, a larger field of view may be set for the imaging device. If the selected image processing strategy is an image cropping strategy, a larger field of view may be set for the imaging device, such that useful information (i.e., video data that is of interest to the user) may be obtained from the cropped image data.

In some embodiments, the method may further include setting the field of view of the imaging device based on the selected target image processing strategy and the imaging mode initiated by the imaging device; and obtaining image data by using the imaging device with the set field of view.

Since the size of the processed image data obtained different image data strategies may be different, and users may have different needs for the quality of the image data in different imaging modes, the field of view of the imaging device may be set based on the selected target image processing strategy and the imaging mode initiated by the imaging device. As such, not only useful information can be obtained from the image data processed by the image processing strategy, different quality needs of the users can also be met.

In some embodiments, when the UAV is in the low speed mode or the high speed mode, and the imaging mode of the imaging device is in the imaging preview mode, the field of view of the imaging device may be set to DFOV=67.6°, HFOV=56.4°, VFOV=43.8°. When the UAV is in the low speed mode, and the imaging mode of the imaging device is in the video capturing mode, field of view of the imaging device may be set to DFOV=57.3°, HFOV=50.9°, VFOV=30.0°. When the UAV is in the high speed mode, and the imaging mode of the imaging device is in the video capturing mode, field of view of the imaging device may be set to DFOV=78.7°, HFOV=71.1°, VFOV=43.8°. When the imaging mode of the imaging device is in the image acquisition mode, the field of view of the imaging device may be set to DFOV=84.3°, HFOV=71.8°, VFOV=57.0°.

In some embodiments, the imaging mode may include one or more of an imaging preview mode, an image acquisition mode, and a video capturing mode. The imaging preview mode, the image acquisition mode, and the video capturing mode may correspond to different field of views of the imaging device.

In some embodiments, the plurality of image processing strategies may include an image cropping strategy. The specific implementation method for processing the image data obtained by the imaging device carried by the UAV based on the target image processing strategy may include performing electronic stabilization processing on the image data obtained by the imaging device based on the image stabilization strategy in response to the target image processing strategy being the image stabilization strategy; or performing cropping processing on the image data obtained by the imaging device based on the image cropping strategy in response to the target image processing strategy being the image cropping strategy.

When the smart device selects the image stabilization strategy as the target image processing strategy, the smart device may perform electronic stabilization processing on the image data obtained by the imaging device based on the image stabilization strategy. As such, the situation of distorted image data due to movement in flight can be avoided, thereby improving the quality of the image data. When the smart device selects the image cropping strategy as the target image processing strategy, the smart device may perform the cropping processing on the image data obtained by the imaging device based on the image cropping strategy. As such, the most real image data can be sent to the user, which can avoid the large-scale correction of the video data that results in low pixel utilization of the image data, thereby improving the quality of the video data.

It should be noted that if the target image processing strategy selected by the smart device is an image cropping strategy, the smart device may perform the cropping processing on the image data based on a predetermined cropping ratio. For example, the image data may be cropped at a 1:1 ratio, that is, the entire image may be cropped; or the image data may be cropped at a 4:3 ratio, that is, three-quarters of the image area of the image data may be cropped.

In some embodiments, if the obtained image data is video data, cropping the video data may include cropping each frame of the video data or certain frames of the image data. That is, cropping the image data with jitter in the video image of the video data.

In the embodiments of the present disclosure, a smart device may adaptively select an image data processing strategy based on the flight state of the UAV, and process image data based on the selected image data processing strategy to improve the quality of the image data. If the selected image data processing strategy is the image stabilization strategy, the image stabilization strategy can be used to process the image data, which can avoid the situation of distorted image data due to hovering or slow flight of the UAV, thereby improving the quality of the image data. If the selected image data processing strategy is a strategy (e.g., an image cropping strategy) other than the image stabilization strategy, the selected image data processing strategy can be used to process the image data. As such, the most real image data can be send to the user, which can avoid the large-scale correction of the image data that results in low pixel utilization of the image data, thereby improving the quality of the video data and is more in line with user's quality needs of the image data.

Figure 3:
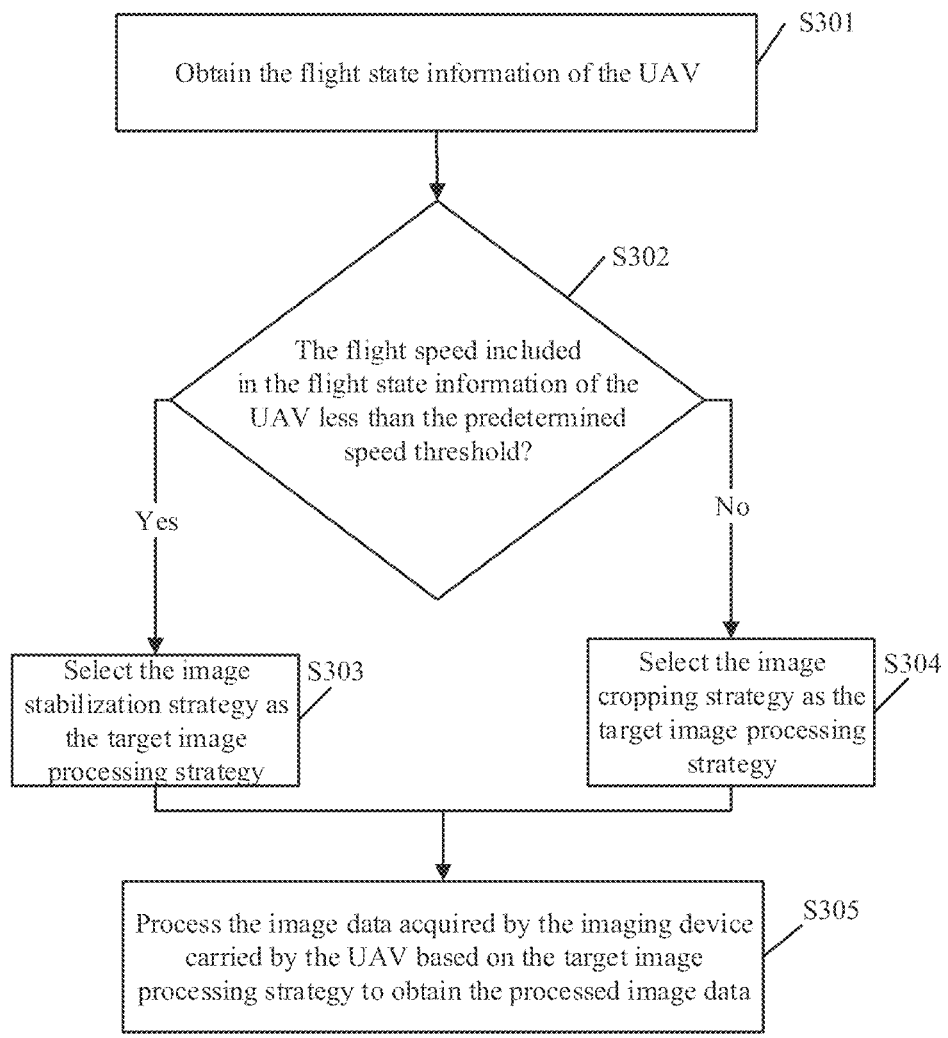
FIG. 3 is a flowchart of an image data processing method according to another embodiment of the present disclosure.

FIG. 3 shows another image data processing method according to an embodiment of the present disclosure. The image data processing method can be applied to an image data processing system. The image data processing system may include a UAV, an imaging device carried by the UAV, and a smart device. The smart device may be the imaging device, or one or more of the terminals that control the UAV, such as a remote control, a smartphone, a tablet computer, a laptop computer, and a ground station. The image data processing method will be described in detail below.

S301, obtaining the flight state information of the UAV.

In some embodiments, the smart device may obtain the flight state information through a sensor of the UAV, the flight state information may include the flight speed.

S302, determining whether the flight speed included in the flight state information of the UAV is less than the predetermined speed threshold, if yes, perform S303, otherwise, perform S304.

The smart device may determine whether the flight speed of the UAV is greater than the predetermined speed threshold. If the flight speed of the UAV is less than the predetermined speed threshold, the flight state of the UAV may be determined to be in the low speed mode and S303 may be performed. Otherwise, the flight state of the UAV may be determined to be in the high speed mode and S304 may be performed.

S303, selecting the image stabilization strategy as the target image processing strategy in response to the flight speed of the UAV being less than the predetermined speed threshold.

If the flight speed of the UAV is less than the predetermined speed threshold, the smart device may determine that the flight state of the UAV is in the low speed mode. As such, the image stabilization strategy can be selected as the target image processing strategy, such that the situation of distorted image data due to hovering or slow flight of the UAV, thereby improving the quality of the image data.

S304, selecting the image cropping strategy as the target image processing strategy in response to the flight speed of the UAV being greater than or equal to the predetermined speed threshold.

If the flight speed of the UAV is greater than or equal to the predetermined speed threshold, the smart device may determine that the flight state of the UAV is in the high speed mode. As such, the image cropping strategy can be selected as the target image processing strategy, such that the most real image data can be send to the user, which can avoid the large-scale correction of the video data that results in low pixel utilization of the image data, thereby improving the quality of the video data.

If the flight state of the UAV is in the high speed mode, correcting the obtained image data may greatly reduce the pixel utilization of the image data. Therefore, when the flight state of the UAV is in the high speed mode, the image data may be cropped or sampled without the correction processing.

In some embodiments, if the flight speed of the UAV is greater than or equal to the predetermined speed threshold, and it is detected that the imaging mode initiated by the imaging device is the imaging preview mode, the smart device may perform sampling processing on the obtained image data to obtain the processed image data. As such, the most real image data can be sent to the user, which can avoid the large-scale correction of the image that results in low pixel utilization of the image data, thereby improving the quality of the video data.

S305, processing the image data obtained by the imaging device carried by the UAV based on the target image processing strategy to obtain the processed image data.

In some embodiments, if the target image processing strategy is the image stabilization strategy, the specific implementation of the processing of the image data obtained by the imaging device carried by the UAV based on the target image processing strategy may include obtaining reference data, the reference data may include image data obtained by the imaging device and the attitude measurement data of the imaging device during the flight of the UAV; and determining the target image are from the image data and processing the target image area based on the attitude measurement data and the target attitude data set for the imaging device to obtain the processed image data.

The smart device may determine the attitude measurement data of the imaging device through the flight attitude information of the UAV, obtain the image data obtained by the imaging device, determine the target image area from the image data based on the attitude measurement data and the target attitude data set for the imaging device, and process the target image area to obtain the processed image data. The target attitude data may be attitude data of the imaging device when the quality of the obtained image data is high. As such, based on the target attitude data and the attitude measurement data, the image data can be stabilized to obtain image data with better quality.

In some embodiments, the specific implementation method for determining the target image area from the image data based on the attitude measurement data and the target attitude data set for the imaging device may include calculating an attitude correction amount based on the attitude measurement data and the target attitude data set for the imaging device, and determining the target image area from the image data based on the attitude correction amount.

The smart device may determine the difference between the attitude data based on the attitude measurement data and the target attitude data set for the imaging device, calculate the attitude correction amount based on the difference of the attitude data, and determine the target image area from the image data based on the attitude correction amount. As such, image data with higher quality may be obtained.

In some embodiments, the imaging device may be a device that performs exposure imaging in units of pixel rows. The attitude measurement data of the imaging device may include attitude measurement data of the imaging device when each row of the image data is obtained. The specific implementation method for calculating the attitude correction amount based on the attitude measurement data and the target attitude data of the imaging device may include calculating the attitude correction amount based on the attitude measurement data corresponding to each row of the image data and the target attitude data.

If the imaging device is a device that performs exposure imaging in units of pixel rows, each row of the image data of the obtained image data may have corresponding measurement data. The smart device may calculate the attitude correction amount based on the attitude measurement data corresponding to each row of the image data and the target attitude data, thereby improving the correction accuracy of the image data.

The attitude correction amount may include a first correction amount, a second correction amount, or a third correction amount for processing the image data. The first correction amount may be a correction amount corresponding to a pitch attitude angle, the second correction amount may be a correction amount corresponding to a roll attitude angle, and the third correction amount may be a correction amount corresponding to a yaw attitude angle.

In some embodiments, the specific implementation method for calculating the attitude correction amount based on the attitude measurement data and the target attitude data of the imaging device may include determining the first correction amount and the second correction amount based on the attitude measurement data and the target attitude data, detecting whether there is a remaining attitude correction amount based on the first correction, the second correction amount, and the total correction amount set of the image data, and determining the third correction amount based on the remaining attitude correction amount in response to detecting the remaining attitude correction amount.

Since the flight attitude of the UAV changes relative quick, in order to improve the quality of the image, the first correction amount, the second correction amount, and the third correction amount may be limited. At the same time, since the three correction amounts are relative, changes in the pitch attitude angle and the roll attitude angle may have greater impact on the image. That is, the user's perception of the changes in the pitch attitude angle and the roll attitude angle may be more obvious than the perception of changes in the yaw attitude angle. Therefore, the first correction amount and the second correction amount may be determined first, and when there is a remaining attitude correction amount, the third correction amount may be determined. That is, the first correction amount and the second correction amount may be determined based on the attitude measurement data and the target attitude data; whether there is a remaining attitude correction amount may be determined based on the first correction amount, the second correction amount, and the total correction amount set for the image data; and the third correction amount may be determined based on the remaining attitude correction amount in response to detecting the remaining attitude correction amount, thereby improving the quality of the image data stabilization process.

The smart device may determine the correction range of the attitude angles of the imaging device based on the correction information of the historical attitude angle of the imaging device set in the UAV. That is, when the flight state of the UAV is in the low speed mode, the range of the attitude angle correction of the imaging device in different imaging modes may be as shown in Table 1, where Max yaw may indicate the maximum correction amount of the yaw angle of the imaging device, Max pitch may indicate the maximum correction amount of the pitch angle of the imaging device, and Max roll may indicate the maximum correction amount of the roll angle of the imaging device. The range of correction amount for correcting the image data may be determined based on the correction range of the attitude angles of the imaging device. In addition, the first correction amount, the second correction amount, and the third correction amount described above may not exceed the range of correction amount set for the image data, which can avoid distortion of the corrected image data.

TABLE 1

| UAV Flight State | Imaging Mode | Max yaw | Max pitch | Max roll |
|---|---|---|---|---|
| Low Speed Mode | Imaging Preview | 2° | 5° | 8° |
| | Video Capturing | 3° | 12° | 32° |

In some embodiments, the method may include obtaining the attitude data of the imaging device during the process of obtaining the image data; filtering the attitude data of the imaging device; and obtaining the target attitude data of the imaging device based on the filtered attitude data, the target attitude data may be the attitude data of the imaging device when the obtained image data meets a predetermined image quality condition.

The smart device may filter the attitude data of the imaging device. That is, to filter out the distorted attitude data in the attitude data of the imaging device, such as relative high attitude data and relative low attitude data. Relatively smooth attitude data may be obtained after filtering, and the target attitude data of the imaging device may be obtained based on the filtered attitude data, the target attitude data may be the attitude data of the imaging device when the obtained image data meets the predetermined image quality condition. That is, the target attitude data may be the attitude data of the imaging device when the quality of the obtained image data is relative high. For example, the target attitude data may be the attitude data of the imaging device when the obtained image data remains horizontally stable.

The smart device may set the roll attitude angle of the target attitude data to 0° and the pitch attitude angle to 0°. The size of the yaw attitude angle may be slightly adjusted based on the flight attitude of the UAV. For example, the adjusted degree may not be greater than a predetermined degree, where the predetermined degree may be 5°.

In some embodiments, the method may include receiving a setting instruction of a target object, the setting instruction may include attitude data of the imaging device; and using the attitude data of the imaging device included in the setting instruction as the target attitude data of the imaging device.

The smart device may receive a setting instruction of a target object, the setting instruction may include attitude data of the imaging device, and the attitude data of the imaging device included in the setting instruction may be used as the target attitude data of the imaging device. That is, the user may manually set the target attitude data of the imaging device.

In the embodiments of the present disclosure, if the flight speed of the UAV is less than the predetermined speed threshold, the smart device may select the image stabilization strategy as the target image processing strategy. By using the image stabilization strategy to process the image data, the situation of distorted image data due to hovering or slow flight of the UAV may be avoided, thereby improving the quality of the image data. In addition, if the flight speed of the UAV is greater than or equal to the predetermined speed threshold, and it is detected that the imaging mode initiated by the imaging device is a video capturing mode, the smart device may select the image cropping strategy as the target image processing strategy. By using the image cropping strategy to process the image data, the most real image data can be sent to the user, which can avoid the large-scale correction of the image data that results in low pixel utilization of the image data, thereby improving the quality of the video data and is more in line with user's quality needs of the image data.

Figure 4:
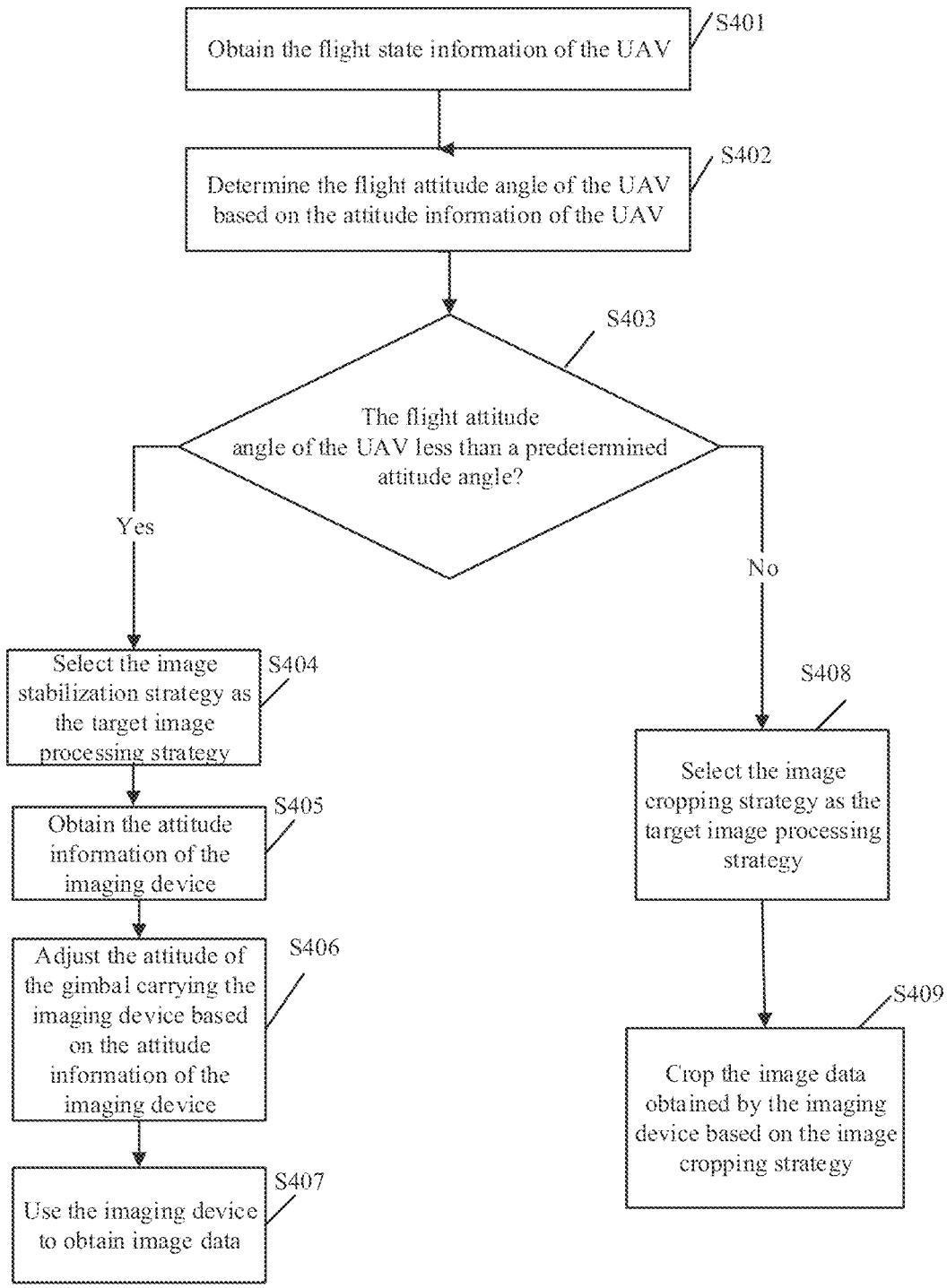
FIG. 4 is a flowchart of an image data processing method according to another embodiment of the present disclosure.

FIG. 4 shows another image data processing method according to an embodiment of the present disclosure. The image data processing method can be applied to an image data processing system. The image data processing system may include a UAV, an imaging device carried by the UAV, and a smart device. The smart device may be the imaging device, or one or more of the terminals that control the UAV, such as a remote control, a smartphone, a tablet computer, a laptop computer, and a ground station. The image data processing method will be described in detail below.

S401, obtaining the flight state information of the UAV.

In some embodiments, the smart device may obtain the flight state information of the UAV. The flight state information may include the attitude information, such that different image data processing strategies can be selected based on the attitude angle of the UAV, and the quality of the image data can be improved.

S402, determining the flight attitude angle of the UAV based on the attitude information of the UAV.

The smart device may determine the flight attitude angle of the UAV based on the attitude information of the UAV.

The flight attitude angle may be an angle between the body coordinate system of the UAV and the ground inertial coordinate system.

S403, determining whether the flight attitude angle of the UAV is less than a predetermined attitude angle, if yes, perform S404-S407, otherwise, perform S408-S409.

The smart device may determine whether the flight attitude angle of the UAV is less than the predetermined attitude angle. If the flight attitude angle of the UAV is less than the predetermined attitude angle, the flight state of the UAV may be determined to be in the low speed mode and S404-S407 may be performed. Otherwise, the flight state of the UAV may be determined to be in the high speed mode and S408-S409 may be performed.

S404, selecting the image stabilization strategy as the target image processing strategy in response to the flight attitude angle being less than the predetermined attitude angle.

If the flight attitude angle is less than the predetermined attitude angle, the flight state of the UAV may be determined to be in the low speed mode, and the image stabilization strategy may be selected as the target image processing strategy. As such, the situation of distorted image data due to hovering or slow flight of the UAV may be avoided, thereby improving the quality of the image data.

S405, obtaining the attitude information of the imaging device.

In some embodiments, since the imaging device is mounted at the gimbal, the attitude information of the imaging device may be determined based on the attitude information of the UAV and the attitude information of the gimbal.

S406, adjusting the attitude of the gimbal carrying the imaging device based on the attitude information of the imaging device.

In some embodiments, the smart device may adjust the attitude of the gimbal carrying the imaging device based on the attitude information of the imaging device. As such, image data with high stability can be obtained, and the quality of the obtained image data can be improved.

S407, using the imaging device to obtain image data.

In some embodiments, after adjusting the attitude of the gimbal, the smart device may use the imaging device to obtain image data.

S408, selecting the image cropping strategy as the target image processing strategy in response to the flight attitude angle being greater than or equal to the predetermined attitude angle.

If the flight attitude angle is greater than or equal to the predetermined attitude angle, and it is detected that the imaging mode initiated by the imaging device is a video capturing mode, the flight state of the UAV may be determined to be in the low speed mode, and the image cropping strategy may be selected as the target image processing strategy. As such, the most real image data can be sent to the user, which can avoid the large-scale correction of the image that results in low pixel utilization of the image data, thereby improving the quality of the image data.

S409, cropping the image data obtained by the imaging device based on the image cropping strategy.

The smart device may perform cropping processing on the image data in the video data obtained by the imaging device based on the image cropping strategy, such that useful image data can be obtained.

It should be noted that if the imaging device is rigidly fixed on the UAV, the attitude information of the imaging device may be determined based on the attitude information of the UAV. However, if the imaging device is mounted at the gimbal, the attitude information of the imaging device may be determined based on the attitude information of the UAV and the gimbal.

In the embodiments of the present disclosure, the smart device may dynamically select the image processing strategy based on the attitude angle of the UAV. If the selected image processing strategy is an image stabilization strategy, the attitude of the gimbal may be adjusted to obtain stable image data to improve the quality of the image data. If the selected image processing strategy is an image cropping strategy, the image in the captured video data may be cropped to improve the quality of the obtained video data.

Figure 5:
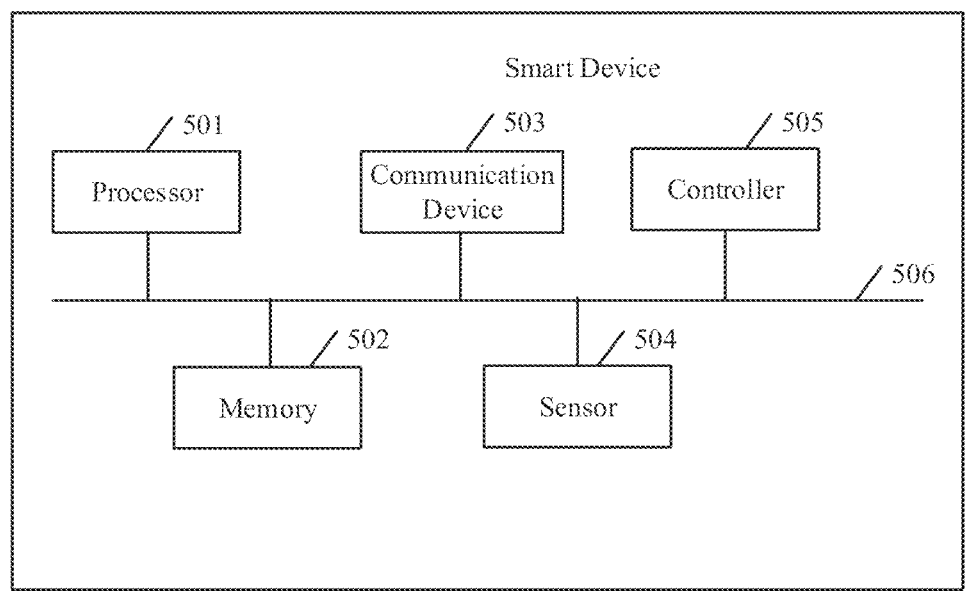
FIG. 5 is a structural diagram of a smart device according to an embodiment of the present disclosure.

FIG. 5 is a structural diagram of a smart device according to an embodiment of the present disclosure. As shown in FIG. 5, the smart device includes at least one processor 501, such as a central processing unit (CPU); at least one memory 502, a communication device 503, a sensor 504, and a controller 505. The processor 501, memory 502, communication device 503, sensor 504, and controller 505 are connected via a bus 506.

The communication device 503 may be configured to receive the flight state information of the UAV, the image data obtained by the imaging device, etc. during the flight of the UAV.

The sensor 504 may be used to generate location information of the smart device.

The memory 502 may be used to store instructions, and the processor 501 may be configured to call the program codes stored in the memory 502.

More specifically, the processor 501 may be configured to call the program codes stored in the memory 502 to obtain the flight state information of the UAV; select a target image processing strategy from a plurality of image processing strategies based on the flight state information, the plurality of image processing strategies include an image stabilization strategy; and process the image data obtained by the imaging device carried by the UAV based on the target image processing strategy to obtain the processed image data.

In some embodiments, the processor 501 may be further configured to call the program codes stored in the memory 502 to obtain an imaging mode of the imaging device; select a target image processing strategy from the plurality of image processing strategies based on the flight state information and the imaging mode; and process the image data obtained by the imaging device carried by the UAV based on the target image processing strategy.

In some embodiments, the processor 501 may be further configured to call the program codes stored in the memory 502 to perform an image stabilization strategy on the image data obtained by the imaging device based on the image stabilization strategy in response to the target image processing strategy being the image stabilization strategy; or, perform cropping processing on the image data obtained by the imaging device based on the image cropping strategy in response to the target image processing strategy being the image cropping strategy.

In some embodiments, the processor 501 may be further configured to call the program codes stored in the memory 502 to select the image stabilization strategy as the target image processing strategy in response to the flight speed of the UAV being less than the predetermined speed threshold; or, select the image cropping strategy as the target image processing strategy in response to the flight speed of the UAV being greater than or equal to the predetermined speed threshold and detecting that the imaging mode initiated by the imaging device is a video capturing mode.

In some embodiments, the processor 501 may be further configured to call the program codes stored in the memory 502 to determine the flight attitude angle of the UAV based on the attitude information of the UAV; select the image stabilization strategy as the target image processing strategy in response to the flight attitude angle being less than the predetermined attitude angle; or, select the image cropping strategy as the target image processing strategy in response to the flight attitude angle being greater than or equal to the predetermined flight attitude angle and detecting that the imaging mode initiated by the imaging device is a video capturing mode.

In some embodiments, the processor 501 may be further configured to call the program codes stored in the memory 502 to set a field of view of the imaging device based on the selected target image processing strategy; and obtain the image data by using the imaging device with the set field of view and process the image data obtained by the imaging device carried by the UAV based on the target image processing strategy.

In some embodiments, the processor 501 may be further configured to call the program codes stored in the memory 502 to set the field of view of the imaging device based on the selected target image processing strategy and the imaging mode initiated by the imaging device; and obtain the image data by using the imaging device with the set field of view and process the image data obtained by the imaging device carried by the UAV based on the target image processing strategy.

In some embodiments, the imaging mode may include one or more of an imaging preview mode, an image acquisition mode, and a video capturing mode. The set field of views of the imaging device corresponding to the imaging preview mode, the image acquisition mode, and the video capturing mode may be different.

In some embodiments, the processor 501 may be further configured to call the program codes stored in the memory 502 to obtain reference data, the reference data may include image data obtained by the imaging device and the attitude measurement data of the imaging device during the flight of the UAV; determine the target image are from the image data based on the attitude measurement data and the target attitude data of the imaging device; and process the target image area to obtain the processed image data.

In some embodiments, the processor 501 may be further configured to call the program codes stored in the memory 502 to calculate an attitude correction amount based on the attitude measurement data and the target attitude data of the imaging device; and determine the target image area from the image data based on the attitude correction amount.

In some embodiments, the processor 501 may be further configured to call the program codes stored in the memory 502 to calculate the attitude correction amount based on the attitude measurement data corresponding to each row of image data and the target attitude data.

In some embodiments, the attitude correction amount may include a first correction amount, a second correction amount, or a third correction amount for processing the image data. The first correction amount may be a correction amount corresponding to a pitch attitude angle, the second correction amount may be a correction amount corresponding to a roll attitude angle, and the third correction amount may be a correction amount corresponding to a yaw attitude angle.

In some embodiments, the processor 501 may be further configured to call the program codes stored in the memory 502 to determine the first correction amount and the second correction amount based on the attitude measurement data and the target attitude data; detecting whether there is a remaining attitude correction amount based on the first correction amount, the second correction amount, and the total correction amount set for the imaging data; and determine the third correction amount based on the remaining attitude correction amount in response to detecting there is a remaining attitude correction amount.

In some embodiments, the processor 501 may be further configured to call the program codes stored in the memory 502 to obtain attitude data of the imaging device during the process of obtaining the image data; filter the attitude data of the imaging device; and obtain the target attitude data of the imaging device based on the filtered attitude data, the target attitude data may be the attitude data of the imaging device when the obtained image data meets the predetermined image quality condition.

In some embodiments, the processor 501 may be further configured to call the program codes stored in the memory 502 to receive a setting instruction of a target object, the setting instruction includes attitude data of the imaging device; and use the attitude data of the imaging device included in the setting instruction as the target attitude data of the imaging device.

In some embodiments, the processor 501 may be further configured to call the program codes stored in the memory 502 to obtain the attitude information of the imaging device; adjust the attitude of the gimbal carrying the imaging device based on the attitude information of the imaging device; and use the imaging device to obtain the image data.

The present disclosure further provides a mobile platform having a power system for providing power to the mobile platform. The mobile platform may also include the smart device as shown in FIG. 5.

The present disclosure further provides a computer program product including a non-transitory computer-readable storage medium that stores a computer program. The computer program may be executed to cause the computer to perform the steps of the image data processing method in the embodiments corresponding to FIGS. 2A-4 described above. For the implementation methods and advantages of the computer program product, reference may be made to the implementation methods and advantages of the image data processing method of FIGS. 2A-4, which will not be repeated here.

It should be noted that, for the sake of brief description, the foregoing method embodiments are represented as a series of actions. However, a person skilled in the art should appreciate that the present disclosure is not limited to the described order of the actions, because according to the present disclosure, some steps may be performed in other orders or simultaneously. It should be further appreciated by a person skilled in the art that the embodiments described in this specification all belong to exemplary embodiments, and the involved actions and modules are not necessarily required by the present disclosure.

A person of ordinary skill in the art may understand that, all or a part of the steps in each method of the foregoing embodiments may be implemented by a program instructing related hardware (for example, a processor). The program may be stored in a computer readable storage medium. The storage medium includes a flash disk, a read-only memory (ROM), a random memory (RAM), a programmable read-only memory (PROM), an erasable programmable read-only memory (EPROM), a one-time programmable read-only memory (OTPROM), an EEPROM, a compact disc read-only memory (CD-ROM), another optical disk memory, magnetic disk memory, or magnetic tape memory, or any other computer-readable medium that can be configured to carry or store data.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An image data processing method comprising:
   obtaining flight state information of an unmanned aerial vehicle (UAV);
   selecting a target image processing strategy from a plurality of image processing strategies based on the flight state information, the plurality of image processing strategies including an image stabilization strategy and an image cropping strategy;
   setting, based on the target image processing strategy, a field of view for an imaging device carried by the UAV, including:
      setting a first field of view for the imaging device in response to the image stabilization strategy being selected as the target image processing strategy; and
      setting a second field of view for the imaging device in response to the image cropping strategy being selected as the target image processing strategy, the first field of view being different from the second field of view;
   obtaining image data through the imaging device, the image data being captured by the imaging device using the set field of view; and
   processing the image data based on the target image processing strategy to obtain processed image data.

2. The method of claim 1, further comprising:
   obtaining an imaging mode initiated by the imaging device;
   wherein selecting the target image processing strategy includes selecting the target image processing strategy from the plurality of image processing strategies based on the flight state information and the imaging mode.

3. The method of claim 1, wherein processing the image data based on the target image processing strategy includes:
   in response to the target image processing strategy being the image stabilization strategy, performing electronic stabilization on the image data based on the image stabilization strategy; or
   in response to the target image processing strategy being the image cropping strategy, performing cropping processing on the image data based on the image cropping strategy.

4. The method of claim 3, wherein the flight state information includes a flight speed, and selecting the target image processing strategy includes:
   selecting the image stabilization strategy as the target image processing strategy in response to the flight speed of the UAV being less than a predetermined speed threshold; or
   selecting the image cropping strategy as the target image processing strategy in response to the flight speed of the UAV being greater than or equal to the predetermined speed threshold.

5. The method of claim 3, wherein the flight state information includes attitude information, and selecting the target image processing strategy includes:

determining a flight attitude angle of the UAV based on the attitude information of the UAV; and selecting the target image processing strategy based on the flight attitude angle, including:
- selecting the image stabilization strategy as the target image processing strategy in response to the flight attitude angle being less than a predetermined attitude angle; or
- selecting the image cropping strategy as the target image processing strategy in response to the flight attitude angle being greater than or equal to the predetermined attitude angle.

6. The method of claim 1, wherein:
selecting the target image processing strategy includes selecting the image stabilization strategy as the target image processing strategy; and
processing the image data includes:
- obtaining attitude measurement data of the imaging device when capturing the image data during flight of the UAV;
- determining a target image area from the image data based on the attitude measurement data and target attitude data of the imaging device; and
- processing the target image area to obtain the processed image data.

7. The method of claim 6, wherein determining the target image area includes:
- calculating an attitude correction amount based on the attitude measurement data and the target attitude data; and
- determining the target image area from the image data based on the attitude correction amount.

8. The method of claim 7, wherein:
- the image device is configured to perform exposure imaging in units of pixel rows;
- the attitude measurement data includes attitude measurement data of the imaging device when obtaining various rows of the image data; and
- calculating the attitude correction amount includes calculating the attitude correction amount based on the attitude measurement data corresponding to the various rows of the image data and the target attitude data.

9. The method of claim 7, wherein the attitude correction amount includes at least one of:
- a first correction amount corresponding to a pitch attitude angle,
- a second correction amount corresponding to a roll attitude angle, or
- a third correction amount corresponding to a yaw attitude angle.

10. The method of claim 9, wherein calculating the attitude correction amount includes:
- determining the first correction amount and the second correction amount based on the attitude measurement data and the target attitude data;
- detecting whether there is a remaining attitude correction amount based on the first correction amount, the second correction amount, and a total correction amount set for the image data; and
- determining the third correction amount based on the remaining attitude correction amount in response to detecting there is the remaining attitude correction amount.

11. The method of claim 6, further comprising:
obtaining attitude data of the imaging device during the process of obtaining the image data; and filtering the attitude data of the imaging device to obtain the target attitude data of the imaging device, the target attitude data being attitude data of the imaging device that allows the imaging device to obtain image data meeting a predetermined image quality condition.

12. The method of claim 6, further comprising:
receiving a setting instruction for a target object, the setting instruction including attitude data of the imaging device; and
using the attitude data of the imaging device included in the setting instruction as the target attitude data of the imaging device.

13. The method of claim 1, wherein:
selecting the target image processing strategy includes selecting the image stabilization strategy as the target image processing strategy; and
processing the image data includes:
- obtaining attitude information of the imaging device;
- adjusting an attitude of a gimbal carrying the imaging device based on the attitude information of the imaging device; and
- obtaining the image data through the imaging device.

14. The method of claim 1, wherein:
obtaining the image data includes obtaining an image frame by the imaging device using exposure imaging in units of pixel rows, the image data including the image frame; and
processing the image data includes:
- obtaining attitude measurement data of the imaging device when capturing the image frame during flight of the UAV; and
- based on the attitude measurement data of the imaging device and exposure parameters of the imaging device when performing the exposure imaging to obtain the image frame, calculating attitude measurement data corresponding to each pixel row of the image frame.

15. The method of claim 14, wherein:
the exposure parameters include a number of exposure lines for obtaining the image frame and an exposure duration of each line.

16. A smart device comprising:
a processor; and
a memory storing program instructions that, when executed by the processor, cause the processor to:
- obtain flight state information of an unmanned aerial vehicle (UAV);
- select a target image processing strategy from a plurality of image processing strategies based on the flight state information, the plurality of image processing strategies including an image stabilization strategy and an image cropping strategy;
- set, based on the target image processing strategy, a field of view for an imaging device carried by the UAV, including:
  - setting a first field of view for the imaging device in response to the image stabilization strategy being selected; and
  - setting a second field of view for the imaging device in response the image cropping strategy being selected, the first field of view being different from the second field of view;
- obtain image data through the imaging device, the image data being captured by the imaging device using the set field of view; and
- process the image data based on the target image processing strategy to obtain processed image data.

17. The device of claim 16, wherein the program instructions further cause the processor to:
  obtain an imaging mode initiated by the imaging device; and
  select the target image processing strategy from the plurality of image processing strategies based on the flight state information and the imaging mode.

18. The device of claim 16, wherein the program instructions further cause the processor to:
  in response to the target image processing strategy being the image stabilization strategy, perform electronic stabilization on the image data based on the image stabilization strategy; or
  in response to the target image processing strategy being the image cropping strategy, perform cropping processing on the image data based on the image cropping strategy.

19. The device of claim 18, wherein the flight state information includes a flight speed, and the program instructions further cause the processor to:
  select the image stabilization strategy as the target image processing strategy in response to the flight speed of the UAV being less than a predetermined speed threshold; or
  select the image cropping strategy as the target image processing strategy in response to the flight speed of the UAV being greater than or equal to the predetermined speed threshold and the imaging mode being a video capturing mode.

20. The device of claim 18, wherein the flight state information includes attitude information, and the program instructions further cause the processor to:
  determine a flight attitude angle of the UAV based on the attitude information of the UAV; and
  select the target image processing strategy based on the flight attitude angle, including:
    selecting the image stabilization strategy as the target image processing strategy in response to the flight attitude angle being less than a predetermined attitude angle; or
    selecting the image cropping strategy as the target image processing strategy in response to the flight attitude angle being greater than or equal to the predetermined attitude angle and the imaging mode being a video capturing mode.

* * * * *